United States Patent [19]
Florjancic

[11] 3,952,434
[45] Apr. 27, 1976

[54] SLIDE-FRAME

[76] Inventor: Peter Florjancic, St.-Martin-Strasse 12, D-81 Garmisch-Partenkirchen, Germany

[22] Filed: Oct. 15, 1973

[21] Appl. No.: 406,384

Related U.S. Application Data
[63] Continuation of Ser. No. 206,687, Dec. 10, 1971, abandoned.

[30] Foreign Application Priority Data
Dec. 16, 1970  Austria .............................. 11328/70

[52] U.S. Cl. ................................................. 40/152
[51] Int. Cl.² .......................................... G09F 1/12
[58] Field of Search ...................... 40/152, 159, 158

[56] References Cited
UNITED STATES PATENTS

| | | | |
|---|---|---|---|
| 2,390,053 | 12/1945 | Bradford | 40/152 |
| 3,341,960 | 9/1967 | Florjancic | 40/152 |
| 3,478,456 | 11/1969 | Mundt | 40/152 |
| 3,530,608 | 9/1970 | Sovia | 40/159 |

FOREIGN PATENTS OR APPLICATIONS

| | | | |
|---|---|---|---|
| 1,162,510 | 9/1958 | France | 40/152 |
| 1,311,727 | 10/1962 | France | 40/152 |

Primary Examiner—Louis G. Mancene
Assistant Examiner—Wenceslao J. Contreras
Attorney, Agent, or Firm—Kemon, Palmer & Estabrook

[57] ABSTRACT

A frame for a photographic slide is made of plastic material and has a pair of masks formed with parallel side and end portions. An outwardly facing chamfered face is provided in at least one of the end portions and forms a funnel into the frame for mounting a photographic slide therein. Projections extending normally to the chamfered face into complementary recesses serve to hold apart the pair of masks when a slide is inserted and these projections also angle outwardly away from the funnel so that the slide is stretched as it is inserted.

5 Claims, 5 Drawing Figures

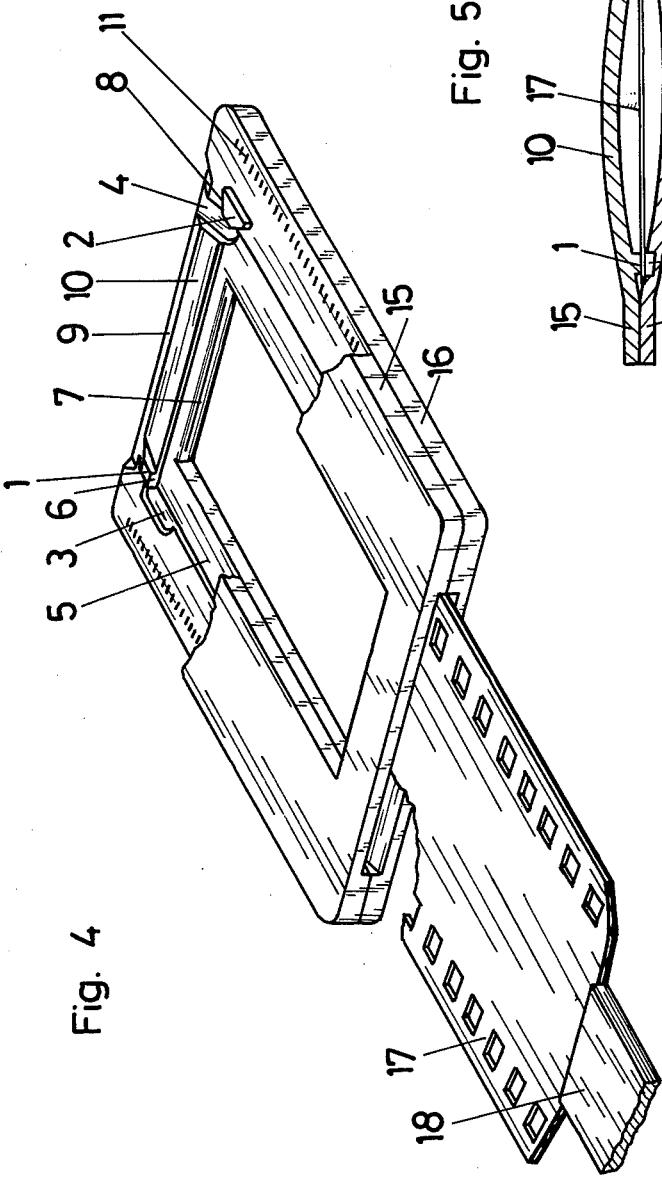

SLIDE-FRAME

This is a continuation of application Ser. No. 206,687, filed Dec. 10, 1971, now abandoned.

The present invention relates to a slide-frame of elastic material, preferably of plastics, comprising a pair of masks with two view-openings each, said mask pair being attached before framing the photographic slides at least in the region of the ends of the two opposite edges by gluing, welding or the like and wherein for framing the mask pair is held apart at one of the two edges not being attached thus forming a slit with decreasing thickness towards its end so that the photographic slide may be inserted in plane condition into the slit up to a stop.

Photographic slides of the aforementioned kind have a thickness of 1 to 2 mm and have no cover glasses. They are used to a great extent for framing souvenir slides and therefor have to be suitable for mechanical framing.

A frame has been known whose mask pair is widened so far by special supplementary means such as pressure pins, opening jaws, suction cups or the like before framing the photographic slide, that said photographic slide may be inserted into the arising slit. This involves various shortcomings, e.g. the mechanism of the framing machine being complicated by the drive of the pins, jaws and so on and owing to the considerable stress the frames crack easily and the framing process is retarded. This considerable stress is caused by the fact that the slit has to be opened relatively wide, namely, considerable more than it corresponds to the thickness of the photographic slide, so that the leading edge of the photographic slide may be inserted securely into the slit. Said inserting causes according to experience, frequently difficulties, as all photographic slides tend to bend more or less. This may be eliminated, it is true, in that the photographic slide is guided in a flat guide running over its whole width. This, however, increases on one hand the danger of scratching by a penetrated foreign body, which would necessitate constant observation. This, however, is difficult with the desired high operating speed. On the other hand, an inserting right through of the photographic slide by a pusher is not possible unless the flat guide is constructed in such manner as to enable the penetrating of the pusher.

These shortcomings are overcome, according to the invention and a fast and secure framing method is attained in that at least one mask is provided at least at the ends of the feeding edge with an outward facing chamfered face, wherein the chamfered face with a mask pair forming a frame face towards the other mask, the mutual holding apart of the mask pair thus being effected by the leading edge of the photographic slide itself.

By the chamfered face according to the invention a kind of flat funnel is formed at the feeding side of the frame, into which funnel the leading edge of the photographic slide penetrates, said photographic slide thereby being straightened if necessary. This funnel effect may be increased in that the mask pair maybe provided with the chamfered face according to the invention, so that the opening of the funnel may essentially extend over the entire thickness of the frame.

If the photographic slide has penetrated into the funnel so far as to rest with its leading edge against the inclined plane or planes, the frame is held apart by the ends of the leading edge owing to the force involved when pushing forward the photographic slide due to the natural elasticity of the mask pair, so that their reciprocal distance is larger in the region of the picture than the thickness of the photographic slide.

The holding apart of the frame therefor is effected by the photographic slide itself without necessitating other devices than a pushing device for the photographic slide.

In order to increase the effect of holding apart by the photographic slide and to further reduce the danger of scratching, the invention suggests further that the chamfered face continues at projections arranged laterally in the region outside the perforations of the photographic slide.

It is useful to construct these projections so oblique that they try to hold apart and therewith to stretch the photographic slide upon its movement. The curvature of the photographic slide which nearly always exists according to experience thereby is eliminated at least upon insertion through the border held apart. The holding apart therefor may be kept within moderate bounds without running the risk that the medium deflected region touches the mask and therefor is scratched. This only moderately holding apart is possible by the photographic slide itself, and moreover the danger of breaking is reduced.

In order to obtain a better lateral guide of the photographic slide the invention furthermore suggests to provide lateral guides known per se in the form of projections engaging into recesses nearby the funnel, said projections being beveled in such manner that they guide the photographic slide with its leading edge towards the center.

An embodiment of the invention is hereinafter described in detail with reference to the accompanying drawings without, however, being limited thereto and the reference numerals are of explanatory character only.

FIG. 4 is a perspective representation of the beginning of a framing process.

FIG. 5 is a section of the frame in hold apart position.

Figure 1:
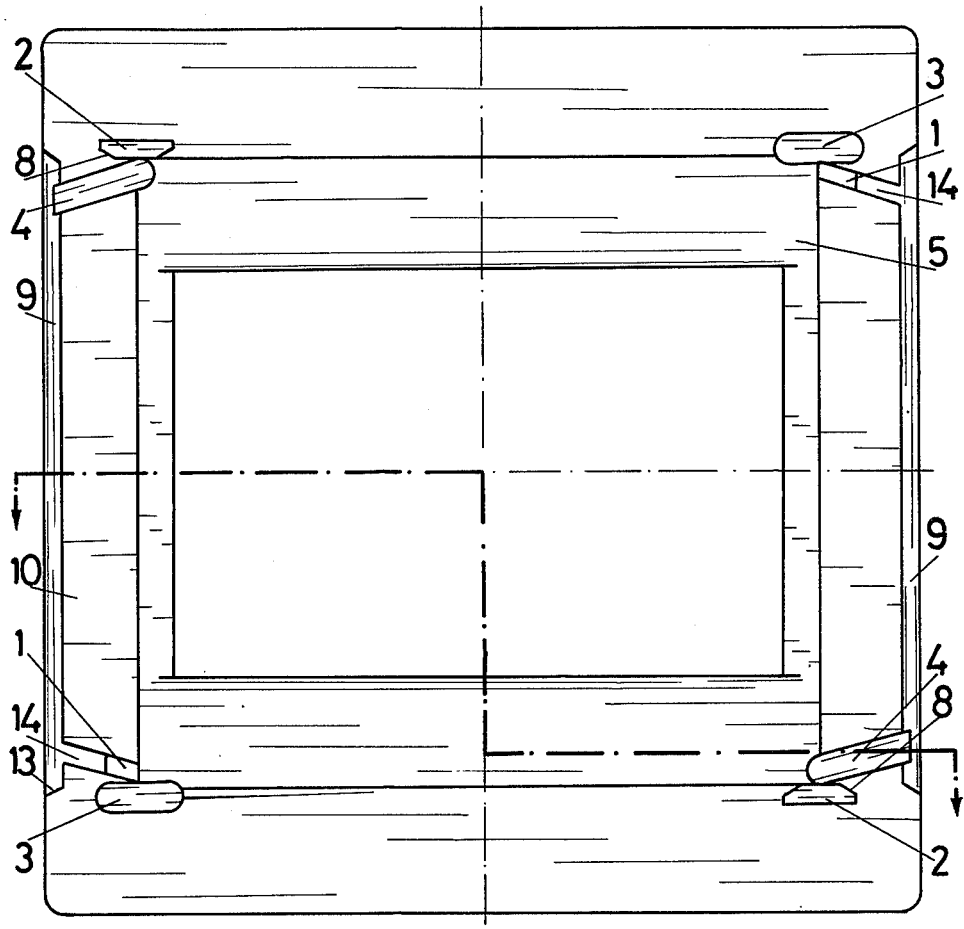
FIG. 1 is a plan view of one half of a mask of the invention enlarged for the sake of clearness.
Figure 2:
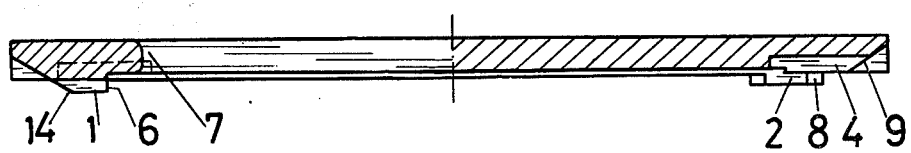
FIG. 2 is a sectional view taken along the line 2—2 of FIG. 1.

As shown in FIGS. 1 and 2 a mask is formed as usual, by an element having essentially the form of a plate with a view-opening.

At the side not visible in FIG. 1 of the mounted frame the mask is smooth. At the side facing inward, a guide 5 is formed for the photographic slide by a recess running around the opening 12. The edges 7 running along the narrow sides of the photographic slide are rounded.

The mask pair is central symmetrical and coextensive. The further description therefor may be limited to one side, i.e. the one adjacent the narrow side of the photographic side.

A chamfered face 9 extends over the side at the edge of the mask. The length of this chamfered face 9 essentially is equal to the breadth of the photographic slide, i.e., equal to the breadth of the guide 5 and the ends are beveled laterally at 13.

At the lateral limitation of the guide of the photographic slide 5 and outside adjacent to it a projection 2 and a recess 3 respectively are provided which engage when the mask pair is folded together. The projection 2 essentially is rectangular and has a chamfered face 8 at the side facing towards the chamfered face 9. The recess 3 is rectangular too but rounded at the ends.

Between the guide 5 and the chamfered face 9 a bridge 10 is formed resting against bridge 10 of the other mask when the frame is mounted. At the ends of the bridge a projection 1 and a recess 4 are provided running divergent away from each other from the chamfered face 9 towards the inside of the frame. The divergence in the figure is represented very exaggerately for reasons of clearness and need to be only some tenth. The projection 1 is provided with an inclined plane 14 having the same inclination as the chamfered face 9 and is contiguous therewith.

Figure 3:
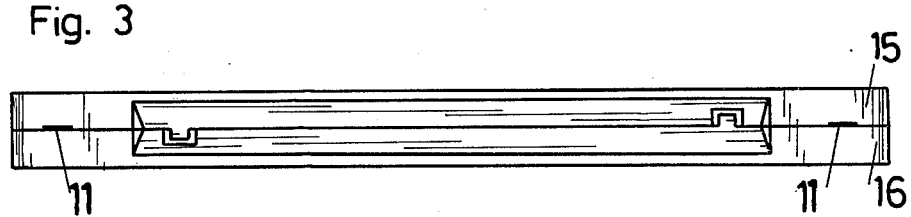
FIG. 3 is an end view of a finished frame shown from the feeding-side.

For mounting a frame two masks 15 and 16 are attached to each other by gluing, welding, riveting or the like in the region 11 (FIGS. 3 and 4). They then lie face to face with their bridges 10 without any gap, whilst large openings 9 in the form of a long funnel are formed by the chamfered faces 9.

If a photographic slide 17 is inserted with its narrow side by a pusher 18 in a guideway (not represented) into this funnel, it is first of all straightened at the penetrating narrow edge even if it has a certain curvature (see FIG. 4). Slight lateral displacements are eliminated by the chamfered faces 13, a possible oblique position being eliminated in that the photographic slide firstly butts at the bottom of the funnel at one side and is held back there, whilst it is continued to be moved at the other side in direction to the inside of the frame.

Upon its further movement, it holds apart the mask pair in such manner as shown in FIG. 5. The bridges 10 remove from each other more than corresponds to the thickness of the photographic slide and the danger of scratching the picture of the part of the photographic slide passing through between bridges 10 is much reduced. This danger furthermore is reduced in that by the oblique position of projections 1 the part of the photographic slide passing through between bridges 10 is tensioned laterally and therewith stretched. An unilateral displacement out from the center thereby is prevented by the projections 2 or corrected by their inclined planes 8 at the beginning of the movement.

A repeated straightening of the photographic slide is effected by the rounding 7, at the moment when the leading edge of the photographic slide meets said rounding. If this edge has reached the end of the film sheet guide 5 at the second bridge 10, the pusher 18 which in the meantime has penetrated into the frame, is withdrawn, whereupon the frame springs back into the untensioned, plane position due to its elasticity and holds firmly the photographic slide in the film sheet guide 5.

It results from the description of the framing process that the photographic slide is inserted in an uninterrupted movement into the previously closed frame whereby its holds the same apart without any additional supplementary means.

Various changes are possible within the scope of the invention. The number of projections and recesses in each mask is not limited to two times two. In particular, the projections 1 and recesses 4 could be split up and have the form of teeth, whereby the stretching effect is still reinforced by the sharp cutting edges. The mask pair could also be different, in particular one mask could be of minor thickness and only have projections whilst the other thicker one could be provided with the corresponding recesses. The connection of the frames need not be effected over the entire length but could be limited in a critical case to four points. On the other hand, the side being opposite the feeding side could be smooth or may be provided with fitting grooves and could also be attached to the other mask so as to form a bag-shaped frame. The shape of the lateral guides 2 could be modified in many ways. The chamfered face need not extend over the entire length of the feeding edge but could be limited to its two ends. In order to enable also the insertion of a bent photographic slide it is suitable that a slit be left in the region of the picture between the mask pair.

What I claim is:

1. A unitary frame for a section of photographic film consisting of a pair of masks made of plastic material, each mask comprising
    a central view opening therein, said opening having relieved inner edges thereon
    a recess in the inner face which surrounds said central view opening, said recess being defined by
    a pair of parallel longitudinal bridges and
    a pair of parallel transverse bridges,
    said masks being fixed together along said longitudinal bridges with the inner faces of the masks facing one another,
    said recess forming an enclosed film bed,
    the inner faces of the transverse bridges of one mask being substantially in contact with the corresponding inner faces of the transverse bridges of the other mask,
    at least one facing pair of the transverse bridges of said masks being unfixed to one another across at least the corresponding width of said film bed,
    at least one transverse bridge of said unfixed pair of transverse bridges having an outward facing chamfered face the length of which corresponds at least to the corresponding width of said film bed providing a funnel into said frame through which a section of photographic film may pass with slight bulging of said unfixed pair of transverse bridges for insertion of said section of film into said film bed and said unfixed pair of transverse bridges return to being substantially in contact upon completion of the insertion of said section of film into said film bed.

2. The frame of claim 1 wherein said central view opening is rectangular.

3. The frame of claim 2 wherein said frame is rectangular.

4. A unitary rectangular frame for a section of photographic film consisting of a pair of rectangular masks made of plastic material, each mask comprising:
    a rectangular central view opening therein, said opening having relieved inner edges thereon
    a recess in the inner face which surrounds said central view opening, said recess being defined by
    a pair of parallel longitudinal bridges and
    a pair of parallel transverse bridges,
    said masks being fixed together along said longitudinal bridges with the inner faces of the masks facing one another,
    said recess forming an enclosed rectangular film bed,
    the inner faces of the transverse bridges of one mask being substantially in contact with the corresponding inner faces of the transverse bridges of the other mask,
    the facing pairs of the transverse bridges of said masks being unfixed to one another across at least the corresponding width of said film bed, each transverse bridge of each mask having an outward facing chamfered face the length of which corresponds at least to the corresponding width of said bed providing a funnel into said frame through which a section of photographic film may pass with slight bulging of the corresponding facing pair of transverse bridges for insertion of said section of film into said film bed and said facing pair of transverse bridges return to being substantially in contact upon completion of the insertion of said section of film into said film bed.

5. A unitary rectangular frame for a section of photographic film consisting of a pair of rectangular masks made of plastic material, said masks being structurally identical to each other and comprising:

- a rectangular central view opening therein, said opening having relieved inner edges thereon
- a recess in the inner face which surrounds said central view opening, said recess being defined by
    - a pair of parallel longitudinal bridges and
    - a pair of parallel transverse bridges, said masks being fixed together along said longitudinal bridges with the inner faces of the masks facing one another, said recess forming an enclosed rectangular film bed, the inner faces of the transverse bridges of one mask being substantially in contact with the corresponding inner faces of the transverse bridges of the other mask, the facing pairs of the transverse bridges of said masks being unfixed to one another across at least the corresponding width of said film bed, each transverse bridge of each mask having an outward facing chamfered face the length of which corresponds at least to the corresponding width of said bed providing a funnel into said frame through which a section of photographic film may pass with slight bulging of the corresponding facing pair of transverse bridges for insertion of said section of film into said film bed and said facing pair of transverse bridges return to being substantially in contact upon completion of the insertion of said section of film into said film bed.

* * * * *